US010027232B2

(12) United States Patent
Zheng et al.

(10) Patent No.: US 10,027,232 B2
(45) Date of Patent: Jul. 17, 2018

(54) MOTOR BI-DIRECTIONAL DC/DC CONVERTER AND CONTROL METHOD THEREOF

(71) Applicant: EATON MANUFACTURING LP, GLASGOW, SUCCURSALE DE MORGES, Morges (CH)

(72) Inventors: Leo Zheng, Shenzhen (CN); David Zheng, Shenzhen (CN); Victory Li, Shenzhen (CN)

(73) Assignee: Eaton Manufacturing LP, Glasgow Succursale, De Morges

( * ) Notice: Subject to any disclaimer, the term of this patent is extended or adjusted under 35 U.S.C. 154(b) by 0 days.

(21) Appl. No.: 15/115,211

(22) PCT Filed: Jan. 23, 2015

(86) PCT No.: PCT/CN2015/071377
§ 371 (c)(1),
(2) Date: Feb. 1, 2017

(87) PCT Pub. No.: WO2015/110051
PCT Pub. Date: Jul. 30, 2015

(65) Prior Publication Data
US 2017/0187296 A1    Jun. 29, 2017

(30) Foreign Application Priority Data

Jan. 27, 2014 (CN) .......................... 2014 1 0039901

(51) Int. Cl.
*H02M 3/335* (2006.01)
*H02M 1/14* (2006.01)
*H02J 7/00* (2006.01)

(52) U.S. Cl.
CPC ....... *H02M 3/33546* (2013.01); *H02J 7/0068* (2013.01); *H02M 1/14* (2013.01)

(58) Field of Classification Search
CPC ..... H02M 3/33546; H02M 1/14; H02J 7/0068
See application file for complete search history.

(56) References Cited

U.S. PATENT DOCUMENTS

| 5,940,280 A | 8/1999 | Murai et al. | |
|---|---|---|---|
| 2012/0112547 A1* | 5/2012 | Ghosh | H02J 9/062 307/66 |
| 2014/0126262 A1* | 5/2014 | Lu | H02M 1/36 363/131 |

FOREIGN PATENT DOCUMENTS

| CN | 101494420 A | 7/2009 |
|---|---|---|
| CN | 101667784 | 3/2010 |

(Continued)

OTHER PUBLICATIONS

Extended European Search Report; Appln No. EP15740224; dated Sep. 1, 2017; 9 pages.

*Primary Examiner* — Jue Zhang
(74) *Attorney, Agent, or Firm* — Ward and Smith, P.A.

(57) ABSTRACT

The present invention provides a bi-directional DC/DC converter and a control method thereof. The bi-directional DC/DC converter comprises a push-pull circuit, a chargeable and dischargeable device, a transformer, a half bridge circuit, a rectifying and filtering circuit and a first switch. The primary side of the transformer is connected to an output of the push-pull circuit. The output of the rectifying and filtering circuit is connected across a bridge arm of the half bridge circuit. The first switch is configured to connect the secondary side of the transformer to an input of the rectifying and filtering circuit, or to connect a part of windings of the secondary side of the transformer to an output of the half bridge circuit while disconnecting the part of windings of the secondary side of the transformer from two terminals of the input of the rectifying and filtering (Continued)

circuit. The bi-directional DC/DC converter of the present invention has fewer components and is low in cost.

19 Claims, 4 Drawing Sheets

(56) References Cited

FOREIGN PATENT DOCUMENTS

| | | | |
|---|---|---|---|
| CN | 102255487 | | 11/2011 |
| CN | 202322394 | U | 7/2012 |
| CN | 202617004 | U | 12/2012 |
| CN | 103187876 | A | 7/2013 |
| CN | 103283115 | A | 9/2013 |
| EP | 2 800 230 | | 11/2014 |
| JP | 2010093868 | A * | 4/2010 |
| WO | WO 2013/097526 | | 10/2012 |

* cited by examiner

MOTOR BI-DIRECTIONAL DC/DC CONVERTER AND CONTROL METHOD THEREOF

RELATED APPLICATIONS

The present application is a 35 U.S.C. § 371 national phase application of PCT International Application No. PCT/CN2015/071377, having an international filing date of Jan. 23, 2015, claiming priority to Chinese Patent Application No. 201410039901.1 filed Jan. 27, 2014. The disclosures of each application are incorporated herein by reference in their entireties. The above PCT International Application was published in the Chinese language as International Publication No. WO 2015/110051.

FIELD OF THE INVENTION

The present invention relates to power electronics, and particularly, to a bi-directional DC/DC converter and a control method thereof.

BACKGROUND OF THE INVENTION

A bi-directional DC/DC converter is a DC converter which can adjust bi-directional power transfer as required. It has been widely applied in DC uninterruptible power systems, aerospace power systems, battery energy storage, electric vehicles, hybrid energy vehicles, fuel cells, DC power amplifiers etc.

A conventional DC/DC converter converts DC of a rechargeable battery to AC, and then converts AC to a required DC through a rectifying and filtering circuit, so as to achieve discharge process of the rechargeable battery. During the process of charging the rechargeable battery, a separate charging circuit is required. Therefore, the DC/DC converter has more components and is complex in structure.

Therefore, it is expected to use a bi-directional DC/DC converter with fewer components and lower cost to achieve the charge and discharge processes of the rechargeable battery, namely to achieve bi-directional power transfer.

SUMMARY OF THE INVENTION

According to the above-mentioned prior art, the present invention provides a bi-directional DC/DC converter, which comprises:

a push-pull circuit or a full bridge circuit;

a chargeable and dischargeable device for providing DC to the push-pull circuit or the full bridge circuit;

a transformer, the primary side of which is connected to an output of the push-pull circuit or the full bridge circuit;

a half bridge circuit;

a rectifying circuit or a rectifying and filtering circuit, an output of which is connected to across a bridge arm of the half bridge circuit;

a first switch, which is configured to connect the secondary side of the transformer to an input of the rectifying circuit or the rectifying and filtering circuit, or connect a part of windings of the secondary side of the transformer to an output of the half bridge circuit while disconnecting the part of windings of the secondary side of the transformer from two terminals of the input of the rectifying circuit or the rectifying and filtering circuit.

Preferably, two switching tubes of the push-pull circuit are connected with anti-parallel diodes.

Preferably, four switching tubes of the full bridge circuit are connected with anti-parallel diodes.

Preferably, the bi-directional DC/DC converter further comprises a first inductor and a second switch, wherein the first inductor and the second switch are connected in parallel and then connected in series to the chargeable and dischargeable device, and are connected in parallel between the positive of the chargeable and dischargeable device and a center tap of the primary side of the transformer.

Preferably, the bi-directional DC/DC converter further comprises a first inductor and a second switch, wherein the first inductor and the second switch are connected in parallel and then connected in series to the chargeable and dischargeable device, and are connected in parallel between the positive of the chargeable and dischargeable device and a terminal of the input of the full bridge circuit.

The present invention provides a control method for the above-mentioned bi-directional DC/DC converter. The control method comprises: controlling the first switch to connect the secondary side of the transformer to the input of the rectifying circuit or the rectifying and filtering circuit; controlling any one or two switching tubes of the half bridge circuit to switch off; and controlling the push-pull circuit or the full bridge circuit to operate in a pulse width modulation (PWM) mode so as to discharge the chargeable and dischargeable device and charge two capacitors of the half bridge circuit. In another embodiment of the present invention, the bi-directional DC/DC converter further comprises a first inductor and a second switch, wherein the first inductor and the second switch are connected in parallel and then connected in series to the chargeable and dischargeable device, and are connected in parallel between the positive of the chargeable and dischargeable device and a center tap of the primary side of the transformer, and the control method of the present invention further comprises: controlling the second switch to switch on. In another embodiment of the present invention, the bi-directional DC/DC converter further comprises a first inductor and a second switch, wherein the first inductor and the second switch are connected in parallel and then connected in series to the chargeable and dischargeable device, and are connected in parallel between the positive of the chargeable and dischargeable device and a terminal of the input of the full bridge circuit, and the control method of the present invention further comprises: controlling the second switch to switch on.

The present invention further provides a control method for the above-mentioned bi-directional DC/DC converter. The control method comprises: controlling the first switch to connect a part of windings of the secondary side of the transformer to the output of the half bridge circuit; controlling switching tubes of the push-pull circuit or the full bridge circuit to switch off, and controlling the half bridge circuit to operate in a PWM mode so as to discharge two capacitors of the half bridge circuit alternately and charge the chargeable and dischargeable device. In another embodiment of the present invention, the bi-directional DC/DC converter further comprises a first inductor and a second switch, wherein the first inductor and the second switch are connected in parallel and then connected in series to the chargeable and dischargeable device, and are connected in parallel between the positive of the chargeable and dischargeable device and a center tap of the primary side of the transformer, and the control method of the present invention further comprises: controlling the second switch to switch off. In another embodiment of the present invention, the bi-directional DC/DC converter further comprises a first inductor and a second switch, wherein the first inductor and the second switch are connected in parallel and then connected in series to the chargeable and dischargeable device, and are connected in parallel between the positive of the chargeable and dischargeable device and a terminal of the input of the full bridge circuit, and the control method of the present invention further comprises: controlling the second switch to switch off.

The bi-directional DC/DC converter of the present invention has fewer components and is low in cost.

BRIEF DESCRIPTION OF THE DRAWINGS

Below, embodiments of the present invention are further described with reference to the drawings, wherein.

REFERENCE SYMBOLS

B rechargeable battery
Tr1 transformer
Tr2 transformer
Q1~Q4, Q7~Q10 metal oxide semiconductor field effect transistor
D1~D10 diode
S1, S2 switch
C1, C2 capacitor
L1~L3 inductor
1 push-pull circuit
2 full bridge rectifying circuit
3 half bridge circuit
4 center tap
5 node
6 terminal
7 terminal
8 terminal
9 terminal
10 node
11 node
12 node
13 node
14 terminal
15 rectifying and filtering circuit
16 full bridge circuit
17 terminal

DETAILED DESCRIPTION OF THE INVENTION

In order to make the objects, technical solutions and advantages of the present invention more apparent, the present invention is further described in detail by using the specific embodiments below, with reference to the drawings.

It should be understood that the specific embodiments described herein are only used for explaining the present invention, and are not intended to limit the present invention.

Figure 1:
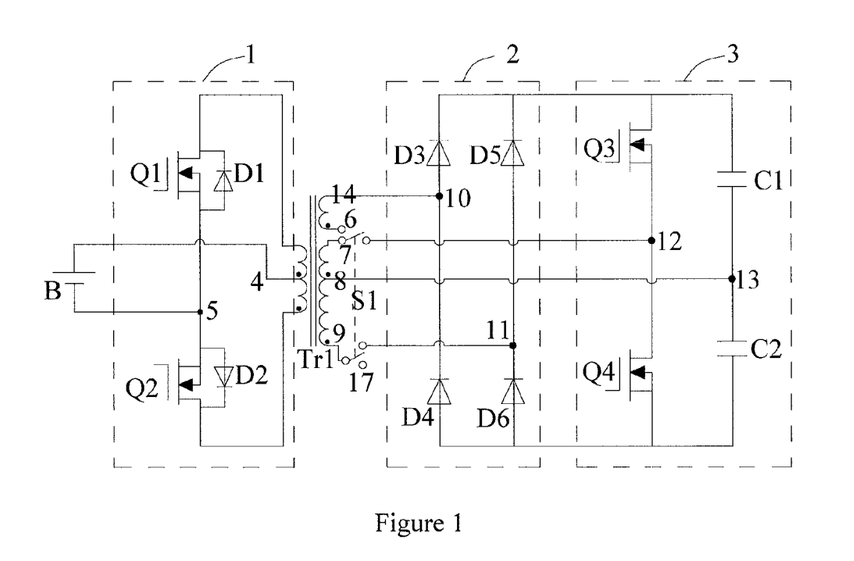
FIG. 1 is a circuit diagram of a bi-directional DC/DC converter of a first embodiment of the present invention.

FIG. 1 is a circuit diagram of a bi-directional DC/DC converter of a first embodiment of the present invention. As shown in FIG. 1, it comprises a push-pull circuit 1, a full bridge rectifying circuit 2, a half bridge circuit 3, a transformer Tr1 and a switch S1. The push-pull circuit 1 comprises metal oxide semiconductor field effect transistors Q1 and Q2, wherein metal oxide semiconductor field effect transistors Q1 and Q2 have a parasitic diode D1 and a parasitic diode D2 respectively. The drain of the metal oxide semiconductor field effect transistor Q1 and the drain of the metal oxide semiconductor field effect transistor Q2 act as the output of the push-pull circuit 1 and is connected to the primary side of the transformer Tr1. The source of the metal oxide semiconductor field effect transistor Q1 and the source of the metal oxide semiconductor field effect transistor Q2 are connected to form a node 5. The center tap 4 of the primary side of the transformer Tr1 and the node 5 act as the input of the push-pull circuit 1. A rechargeable battery B which can provide DC is connected to the input of the push-pull circuit 1. The full bridge rectifying circuit 2 comprises diodes D3~D6, wherein the anode of the diode D3 and the cathode of the diode D4 are connected to form a node 10, the anode of the diode D5 and the cathode of the diode D6 are connected to form a node 11, the nodes 10 and 11 act as the input of the full bridge rectifying circuit 2, and the cathode of the diode D5 and the anode of the diode D6 act as the output of the full bridge rectifying circuit 2. The half bridge circuit 3 comprises metal oxide semiconductor field effect transistors Q3 and Q4, capacitors C1 and C2. The capacitors C1 and C2 are connected to form a node 13. The source of the metal oxide semiconductor field effect transistor Q3 and the drain of the metal oxide semiconductor field effect transistors Q4 are connected to form a node 12, wherein the metal oxide semiconductor field effect transistors Q3 and Q4 act as a bridge arm of the half bridge circuit 3, and the nodes 12 and 13 act as the output of the half bridge circuit 3. The output of the full bridge rectifying circuit 2 is connected across the bridge arm of the half bridge circuit 3, i.e. the output of the full bridge rectifying circuit 2 is connected to the drain of the metal oxide semiconductor field effect transistor Q3 and the source of the metal oxide semiconductor field effect transistor Q4. The secondary side of the transformer Tr1 has three windings, wherein the first winding has terminals 6 and 14, the second winding has terminals 7 and 8, and the third winding has terminals 8 and 9. The terminal 8 is a common terminal of the second winding and the third winding. The terminal 14 is connected to the node 10, and the terminal 8 is connected to the node 13, wherein the terminals 14 and 9 act as the two terminals of the secondary side of the transformer Tr1. The switch S1 is a double pole double throw switch, which comprises a suspension terminal 17. The switch S1 is controlled to connect the terminal 6 to the terminal 7 and connect the terminal 9 to the node 11 in the first state, so that the two terminals of the secondary side of the transformer Tr1 are connected to the input of the full bridge rectifying circuit 2. The switch S1 is controlled to connect the terminal 7 to the node 12 and disconnect the terminal 9 from the node 11 (i.e. connect the terminal 9 to the terminal 17), so that the output of the half bridge circuit 3 is connected to a winding between the terminal 7 and the terminal 8 of the transformer Tr1, and the two terminals of the input of the full bridge rectifying circuit 2 (i.e. the nodes 10 and 11) are disconnected from the winding between the terminal 7 and the terminal 8 of the transformer Tr1. In other embodiments of the present invention, the node 13 can be connected to the grounding.

The operating principle of the bi-directional DC/DC converter shown in FIG. 1 will be described below with reference to FIGS. 2 and 3.

Figure 2:
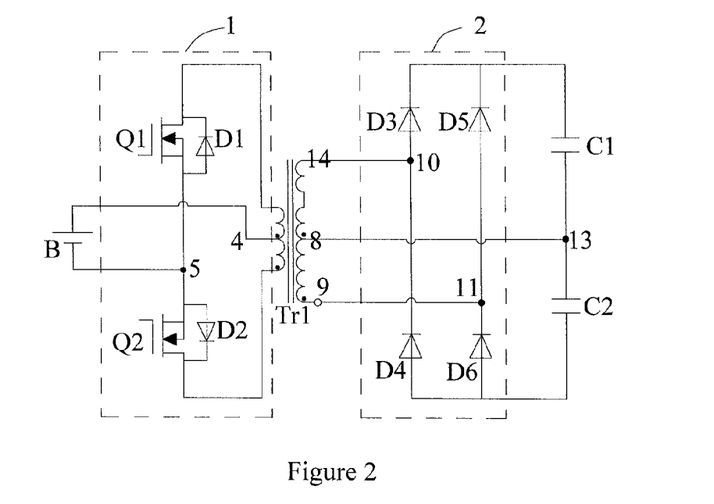
FIG. 2 is an equivalent circuit diagram of the bi-directional DC/DC converter shown in FIG. 1 in the back-up mode.

FIG. 2 is an equivalent circuit diagram of the bi-directional DC/DC converter shown in FIG. 1 in the back-up mode. In the back-up mode, i.e. in the discharging process of the rechargeable battery B, the switch S1 is controlled to connect two terminals of the secondary side of the transformer Tr1 (the terminals 9 and 14) to the input of the full bridge rectifying circuit 2 (the nodes 10 and 11), the metal oxide semiconductor field effect transistors Q3 and/or Q4 are controlled to switch off, the equivalent circuit diagram is shown in FIG. 2. In the present embodiment, the push-pull circuit 1 can be controlled by using the control method in the prior art, so as to discharge the rechargeable battery B and charge the capacitors C1 and C2. For example, a pulse width modulation (PWM) signal is provided to the gates of the metal oxide semiconductor field effect transistors Q1 and Q2, and in the first time period, the metal oxide semiconductor field effect transistor Q1 is controlled to switch on and the metal oxide semiconductor field effect transistor Q2 is controlled to switch off, thus the rechargeable battery B discharges through the metal oxide semiconductor field effect transistor Q1 at the primary side of the transformer Tr1, and the secondary side of the transformer Tr1 charges the capacitors C1 and C2 simultaneously through the full bridge rectifying circuit 2. In the second time period, the metal oxide semiconductor field effect transistor Q1 is controlled to switch off and the metal oxide semiconductor field effect transistor Q2 is controlled to switch on, thus the rechargeable battery B discharges through the metal oxide semiconductor field effect transistor Q2 at the primary side of the transformer Tr1, and the secondary side of the transformer Tr1 charges the capacitors C1 and C2 simultaneously through the full bridge rectifying circuit 2. Then the control methods in the first time period and the second time period are repeated alternately, so as to achieve the transfer of the power from the rechargeable battery B to the capacitors C1 and C2. In the present embodiment, the duty cycle of the PWM signal applied to the metal oxide semiconductor field effect transistors Q1 and Q2 may be constant or variable. In other embodiments of the present invention, the voltages across the capacitor C1 and the capacitor C2 may be positive voltage and negative voltage respectively when the node 13 is grounded.

Figure 3:
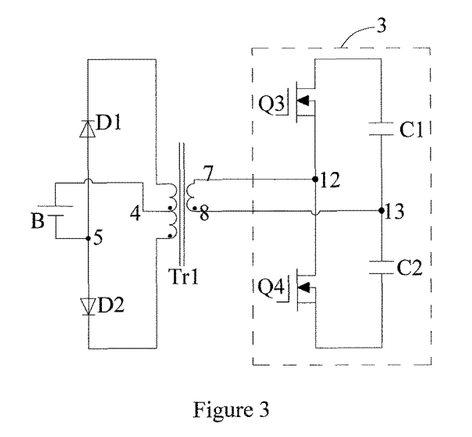
FIG. 3 is an equivalent circuit diagram of the bi-directional DC/DC converter shown in FIG. 1 in the charge mode.

FIG. 3 is an equivalent circuit diagram of the bi-directional DC/DC converter shown in FIG. 1 in the charge mode. In the charge mode, i.e. in the charge process of the rechargeable battery B, the switch S1 is controlled to connect the output of the half bridge circuit 3 to the winding between the terminal 7 and the terminal 8 of the transformer Tr1, i.e. the node 12 and the node 13 are connected to the terminal 7 and the terminal 8 respectively while disconnecting the terminal 9 from the node 11, the metal oxide semiconductor field effect transistors Q1 and Q2 are controlled to switch off, the equivalent circuit diagram is shown in FIG. 3. In the present embodiment, the half bridge circuit 3 can be controlled by using the control method in the prior art, so as to discharge the capacitors C1 and C2 and charge the rechargeable battery B. For example, a PWM signal is provided to the gates of the metal oxide semiconductor field effect transistors Q3 and Q4, and in the first time period, the metal oxide semiconductor field effect transistor Q3 is controlled to switch on and the metal oxide semiconductor field effect transistor Q4 is controlled to switch off, thus the capacitor C1 discharges, and the current generated in the primary side of the transformer Tr1 flows to the positive of the rechargeable battery B through the diode D2, so as to charge the rechargeable battery B. In the second time period, the metal oxide semiconductor field effect transistor Q3 is controlled to switch off and the metal oxide semiconductor field effect transistor Q4 is controlled to switch on, thus the capacitor C2 discharges, and the current generated in the primary side of the transformer Tr1 flows to the positive of the rechargeable battery B through the diode D1, so as to charge the rechargeable battery B. Then the control method in the first time period and the second time period are repeated alternately, so as to continually charge the rechargeable battery B by alternately discharging the capacitor C1 and the capacitor C2. In the present embodiment, the duty cycle of the PWM signal applied to the metal oxide semiconductor field effect transistors Q3 and Q4 may be constant or variable.

Figure 4:
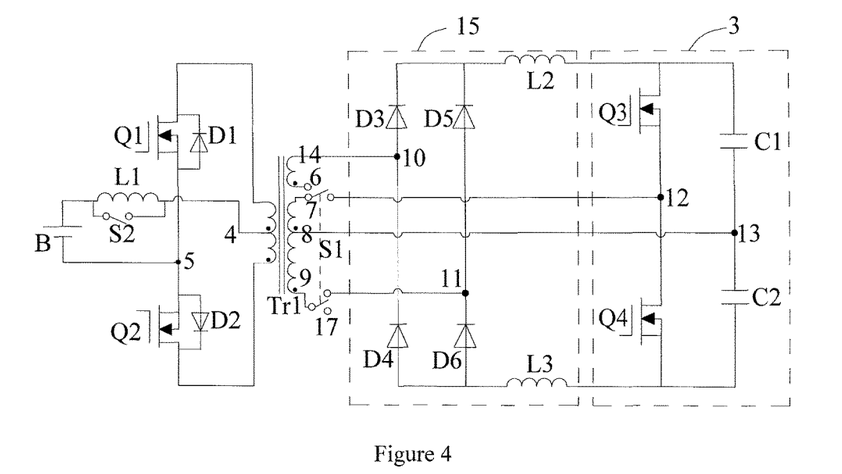
FIG. 4 is a circuit diagram of a bi-directional DC/DC converter of a second embodiment of the present invention.

FIG. 4 is a circuit diagram of a bi-directional DC/DC converter of a second embodiment of the present invention, which is similar to that shown in FIG. 1. The difference is that the bi-directional DC/DC converter of FIG. 4 further comprises an inductor L1, a switch S2, an inductor L2 and an inductor L3, wherein the inductor L1 and the switch S2 are connected in parallel and then connected in series to the rechargeable battery B, and are connected in parallel between the positive of the rechargeable battery B and the center tap 4, the inductor L2 is connected between the diode D5 and the drain of the metal oxide semiconductor field effect transistor Q3, the inductor L3 is connected between the anode of the diode D6 and the source of the metal oxide semiconductor field effect transistor Q4, and the inductors L2, L3 and the full bridge rectifying circuit 2 constitute the rectifying and filtering circuit 15. Thus from the circuit shown in FIG. 4, it can be understood that the output of the rectifying and filtering circuit 15 is connected across the capacitors C1 and C2 of the half bridge circuit 3.

Figure 5:
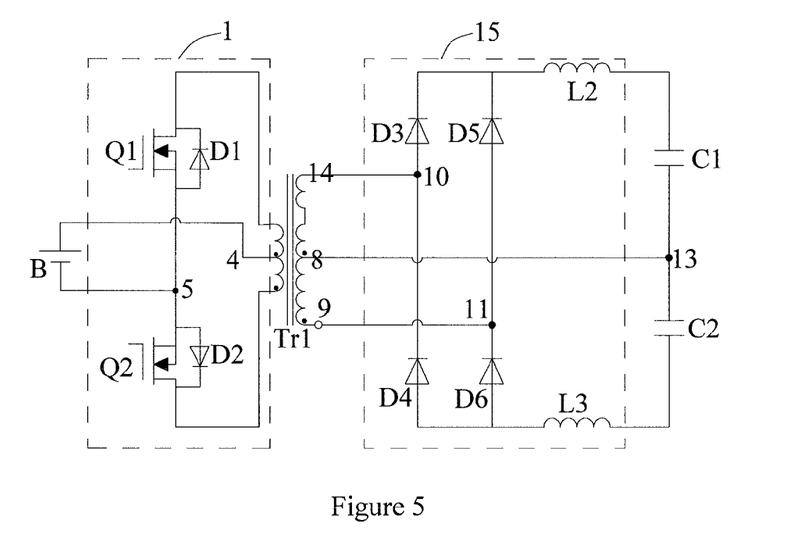
FIG. 5 is an equivalent circuit diagram of the bi-directional DC/DC converter shown in FIG. 4 in the back-up mode.

FIG. 5 is an equivalent circuit diagram of the bi-directional DC/DC converter shown in FIG. 4 in the back-up mode, which is similar to that shown in FIG. 2. The difference is that the full bridge rectifying circuit 2 in the FIG. 2 is replaced with a rectifying and filtering circuit 15 and the switch S2 is controlled to switch on all the time. In the present embodiment, the push-pull circuit 1 can be controlled by using the control method in the prior art, so as to discharge the rechargeable battery B and charge the capacitors C1 and C2. For example, it can be realized through the following control method: a PWM signal is provided to the gates of the metal oxide semiconductor field effect transistors Q1 and Q2, and in the first time period, the metal oxide semiconductor field effect transistor Q1 is controlled to switch on and the metal oxide semiconductor field effect transistor Q2 is controlled to switch off, thus the rechargeable battery B discharges through the metal oxide semiconductor field effect transistor Q1 at the primary side of the transformer Tr1, and the secondary side of the transformer Tr1 charges the capacitors C1 and C2 simultaneously through the rectifying and filtering circuit 15. In the second time period, the metal oxide semiconductor field effect transistors Q1 and Q2 are controlled to switch off, thus electric energy stored in the inductors L2 and L3 charges the capacitors C1 and C2 at the secondary side of the transformer Tr1. In the third time period, the metal oxide semiconductor field effect transistor Q1 is controlled to switch off and the metal oxide semiconductor field effect transistor Q2 is controlled to switch on, thus the rechargeable battery B discharges through the metal oxide semiconductor field effect transistor Q2 at the primary side of the transformer Tr1, and the secondary side of the transformer Tr1 charges the capacitors C1 and C2 simultaneously through the rectifying and filtering circuit 15. In the fourth time period, the metal oxide semiconductor field effect transistors Q1 and Q2 are controlled to switch off, thus electric energy stored in the inductors L2 and L3 charges the capacitors C1 and C2 at the secondary side of the transformer Tr1. Then the control methods from the first time period to the fourth time period are repeated sequentially, so as to achieve the transfer of the power from the rechargeable battery B to the capacitors C1 and C2.

Figure 6:
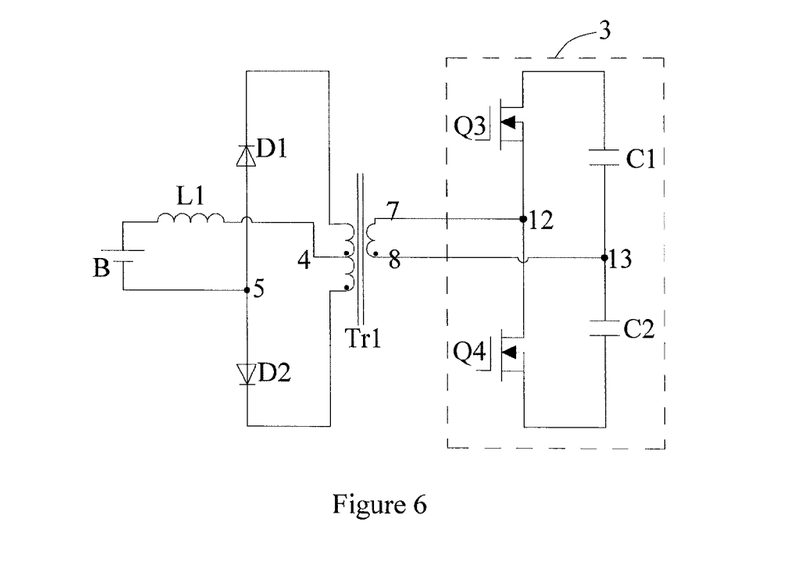
FIG. 6 is an equivalent circuit diagram of the bi-directional DC/DC converter shown in FIG. 4 in the charge mode.

FIG. 6 is an equivalent circuit diagram of the bi-directional DC/DC converter shown in FIG. 4 in the charge mode, which is similar to that shown in FIG. 3. The difference is that the switch S2 of FIG. 6 is controlled to switch off, so that the inductor L1 is connected between the center tap 4 and the positive of the rechargeable battery B. In the present embodiment, the half bridge circuit 3 can be controlled by using the control method in the prior art, so as to discharge the capacitors C1 and C2 and charge the rechargeable battery B. For example, a PWM signal is provided to the gates of the metal oxide semiconductor field effect transistors Q3 and Q4, and in the first time period, the metal oxide semiconductor field effect transistor Q3 is controlled to switch on and the metal oxide semiconductor field effect transistor Q4 is controlled to switch off, thus the capacitor C1 discharges, and the primary side of the transformer Tr1 charges the rechargeable battery B through the diode D2 and the inductor L1 In the second time period, the metal oxide semiconductor field effect transistors Q3 and Q4 are controlled to switch off, thus electric energy stored in the inductor L1 charges the rechargeable battery B. In the third time period, the metal oxide semiconductor field effect transistor Q3 is controlled to switch off and the metal oxide semiconductor field effect transistor Q4 is controlled to switch on, thus the capacitor C2 discharges and the primary side of the transformer Tr1 charges the rechargeable battery B through the diode D1 and the inductor L1. In the fourth time period, the metal oxide semiconductor field effect transistors Q3 and Q4 are controlled to switch off, thus electric energy stored in the inductor L1 charges the rechargeable battery B. Then the control methods from the first time period to the fourth time period are repeated sequentially, so as to achieve the transfer of the power from the rechargeable battery B to the capacitors C1 and C2.

In the present embodiment, the rectifying and filtering circuit 15 can effectively filter ripple current in the back-up mode (i.e. during the discharge process of the rechargeable battery B), so as to reduce impulse and damage to the capacitors C1 and C2. In addition, the inductor L1 can effectively filter ripple current in the charge mode, so as to reduce damage to the rechargeable battery B.

Figure 7:
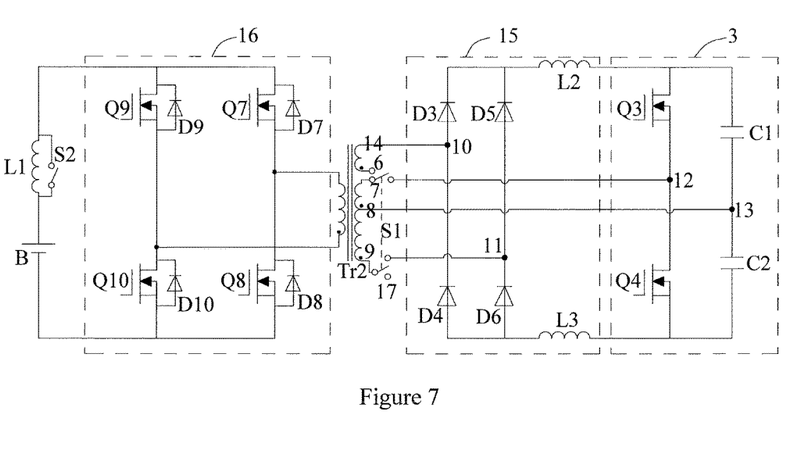
FIG. 7 is a circuit diagram of a bi-directional DC/DC converter of a third embodiment of the present invention.

FIG. 7 is a circuit diagram of a bi-directional DC/DC converter of a third embodiment of the present invention, which is similar to that shown in FIG. 4. The difference is that the transformer Tr1 in the FIG. 4 is replaced with a transformer Tr2 and the push-pull circuit 1 in the FIG. 4 is replaced with a full bridge circuit 16, wherein the full bridge circuit 16 comprises a metal oxide semiconductor field effect transistor Q7 having an anti-parallel diode D7, a metal oxide semiconductor field effect transistor Q8 having an anti-parallel diode D8, a metal oxide semiconductor field effect transistor Q9 having an anti-parallel diode D9, and a metal oxide semiconductor field effect transistor Q10 having an anti-parallel diode D10. The metal oxide semiconductor field effect transistors Q7 and Q8 constitute a first bridge arm. The metal oxide semiconductor field effect transistors Q9 and Q10 constitute a second bridge arm. Intermediate nodes of the first bridge arm and the second bridge arm act as the output of the full bridge circuit 16. The secondary side of the transformer Tr2 is the same as that of the transformer Tr1, which is not discussed here. The two terminals of the primary side of the transformer Tr2 are connected to the output of the full bridge circuit 16. Two terminals of the first bridge arm or the second bridge arm act as the input of the full bridge circuit 16. The inductor L1 and the switch S2 are connected in parallel and then connected in series to the rechargeable battery B, and are connected in parallel between the positive of the rechargeable battery B and the drain of the metal oxide semiconductor field effect transistor Q9. In this circuit diagram, in the back-up mode, the switch S2 is controlled to switch on, the switch S1 is controlled to connect the secondary side of the transformer Tr2 to the input of the rectifying and filtering circuit 15, the metal oxide semiconductor field effect transistors Q3 or/and Q4 are controlled to switch off, and the full bridge circuit 16 is controlled to work in PWM mode in the prior art. Therefore, an alternating magnetic field is generated in the transformer Tr2, and the induced current charges the capacitors C1 and C2 through the rectifying and filtering circuit 15, so as to achieve the transfer of the power from the rechargeable battery B to the capacitors C1 and C2. In the charge mode, the switch S2 is controlled to switch off, the switch S1 is controlled to connect the output of the half bridge circuit 3 to the winding between the terminals 7 and 8 of the secondary side of the transformer Tr2, the metal oxide semiconductor field effect transistors Q7~Q10 are controlled to switch off, and the half bridge circuit 3 is controlled by the same control method as that of the above second embodiment, so as to achieve discharging of the capacitors C1 and C2 and charging of the rechargeable battery B.

In the above embodiment, a control device for controlling the operating state of the metal oxide semiconductor field effect transistors Q1~Q4 and the metal oxide semiconductor field effect transistors Q7~Q10. Those skilled in the art will appreciate that any control device providing the above control signals can be employed. In addition, the metal oxide semiconductor field effect transistor in above embodiment can be replaced with an insulated gate bipolar transistor connecting anti-parallel diode.

In the above embodiments of the present invention, there is no limit to the direction of the coil windings of the transformers Tr1 and Tr2. In the above embodiments of the present invention, the node 13 can be grounded. In the other embodiments of the present invention, the push-pull circuit 1 of the first embodiment can be replaced with the full bridge circuit 16. In the other embodiments of the present invention, the primary side of the transformer Tr1 can be composed of two coil windings having the same turns connected in series, and the number of windings of the secondary side of the transformers Tr1 and Tr2 is not limited to three in the above embodiments, so long as the following conditions are met: when the switch is in the first state, two terminals of the secondary side of the transformer are connected to the input of the rectifying circuit 2 or rectifying and filtering circuit 15; and when the switch is in the second state, a part of windings of the secondary side of the transformer is connected to the output of the half bridge circuit 3, and is disconnected from the two terminals of the input of the rectifying circuit 2 or rectifying and filtering circuit 15.

Although the present invention has been described with reference to preferred embodiments, the present invention is not limited to the embodiments described herein. And the features and operations of the invention as described are susceptible to various modifications and alterations, without departing from the scope of the invention.

The invention claimed is:

1. A bi-directional DC/DC converter, comprising:
a converter circuit;
a chargeable and dischargeable device coupled to a first port of the converter circuit;
a transformer, a primary winding of which is connected to a second port of the converter circuit;
a rectifier circuit;
a half bridge circuit coupled between first and second terminals of a first port of the rectifier circuit;
first and second capacitors coupled in series between first and second terminals of the first port of the rectifier circuit and wherein a center tap of a secondary winding of the transformer is directly coupled to a node at which the first and second capacitors are coupled; and
a switching circuit configured to connect the secondary winding of the transformer to a second port of the rectifier circuit in a first mode and to connect a portion of the secondary winding of the transformer to the half bridge circuit and bypass the rectifier circuit in a second mode,
wherein the half bridge circuit is inactive while the converter circuit generates an AC voltage at the primary winding of the transformer and the rectifier generates a DC voltage at its first port in the first mode and wherein the half bridge circuit generates an AC voltage across the portion of the secondary winding and the converter circuit generates a DC voltage at its first port in the second mode.

2. The bi-directional DC/DC converter according to claim 1, wherein the converter circuit comprises a push-pull circuit and wherein two switching transistors of the push-pull circuit are connected with anti-parallel diodes.

3. The bi-directional DC/DC converter according to claim 1, wherein the converter circuit comprises a full-bridge circuit and wherein four switching transistors of the full bridge circuit are connected with anti-parallel diodes.

4. The bi-directional DC/DC converter according to claim 1, further comprising a parallel-connected combination of an inductor and a switch connected in series with the chargeable and dischargeable device between a positive terminal of the chargeable and dischargeable device and a center tap of the primary winding of the transformer.

5. The bi-directional DC/DC converter according to claim 1 further comprising a parallel-connected combination of an inductor and a switch connected in series with the chargeable and dischargeable device between a positive terminal of the chargeable and dischargeable device and a terminal of the converter circuit.

6. A control method for the bi-directional DC/DC converter according to claim 1, the control method comprising:
controlling the switching circuit to connect the secondary winding of the transformer to the second port of the rectifier circuit;
controlling any one or two switching transistors of the half bridge circuit to switch off; and
controlling the converter circuit to operate in a pulse width modulation mode so as to discharge the chargeable and dischargeable device and charge two capacitors coupled to the half bridge circuit.

7. A control method according to claim 6, wherein the bi-directional DC/DC converter further comprises a parallel-connected combination of an inductor and a switch connected in series with the chargeable and dischargeable device between a positive terminal of the chargeable and dischargeable device and a center tap of the primary winding of the transformer, and the control method further comprises controlling the switch to switch on.

8. A control method according to claim 6, wherein the bi-directional DC/DC converter further comprises a parallel-connected combination of an inductor and a second switch connected in series the chargeable and dischargeable device, and are connected in parallel between a positive terminal of the chargeable and dischargeable device and a terminal of the converter circuit, and the control method further comprises controlling the second switch to switch on.

9. A control method according to claim 6, further comprising:
controlling the switching circuit to connect the portion of the secondary side winding of the transformer to the half bridge circuit;
controlling switching transistors of the converter circuit to switch off; and
controlling the half bridge circuit to operate in a pulse width modulation mode so as to alternately discharge two capacitors coupled between the first and second terminals of the first port of the rectifier circuit and charge the chargeable and dischargeable device.

10. A control method according to claim 9, wherein the bi-directional DC/DC converter further comprises a parallel-connected combination of an inductor and a second switch connected in series with the chargeable and dischargeable device between a positive terminal of the chargeable and dischargeable device and a center tap of the primary winding of the transformer, and wherein the control method further comprises controlling the second switch to switch off.

11. A control method according to claim 9, wherein the bi-directional DC/DC converter further comprises a parallel-connected combination of an inductor and a second switch connected in series with the chargeable and dischargeable device between a positive terminal of the chargeable and dischargeable device and a terminal of the converter circuit, and wherein the control method further comprises controlling the second switch to switch off.

12. The bi-directional DC/DC converter according to claim 1, wherein the rectifier circuit comprises a full-bridge circuit and further comprising at least one inductor coupling the full-bridge circuit to the half bridge circuit.

13. The bi-directional DC/DC converter according to claim 1, wherein the switching circuit comprises:
a first switch configured to selectively couple the half bridge circuit to first and second portions of the secondary winding; and
a second switch configured to couple and decouple the rectifier circuit to and from an end terminal of the secondary winding.

14. A bi-directional DC/DC converter, comprising:
a first converter circuit having a first port configured to be coupled to an energy storage device;
a transformer having a primary winding connected to a second port of the first converter circuit;
a rectifier circuit;
a second converter circuit having a first port coupled to an output of the rectifier circuit;
first and second capacitors coupled in series between first and second terminals of the first port of the second converter circuit and wherein a center tap of a secondary winding is directly coupled to a node at which the first and second capacitors are coupled; and a switching circuit configured to connect the secondary winding of the transformer to an input of the rectifier circuit in a first mode to support power transfer from the energy storage device to the first port of the second converter circuit and to connect the secondary winding to a second port of the second converter circuit while bypassing the rectifier circuit in a second mode to support power transfer from the first port of the second converter circuit to the energy storage device, wherein the second converter circuit is inactive while the first converter circuit generates an AC voltage at the primary winding of the transformer and the rectifier generates a DC voltage at its output in the first mode and wherein the second converter circuit generates an AC voltage across a portion of the secondary winding and the converter circuit generates a DC voltage at its first port in the second mode.

15. The bi-directional DC/DC converter according to claim 14, wherein the first converter circuit comprises a push-pull circuit or a full-bridge circuit and wherein the second converter circuit comprises a half bridge circuit.

16. The bi-directional DC/DC converter according to claim 14, wherein the switching circuit is configured to couple a first portion of the secondary winding to the input of the rectifier circuit in the first mode and to couple a second portion of the secondary winding to the second port of the second converter circuit in the second mode.

17. The bi-directional DC/DC converter according to claim 14, wherein the rectifier circuit comprises a full-bridge circuit and wherein the bi-directional DC/DC converter further comprises at least one inductor coupling the full-bridge circuit to the second converter circuit.

18. The bi-directional DC/DC converter according to claim 14, wherein the switching circuit comprises:
 a first switch configured to selectively couple the second converter circuit to first and second portions of the secondary winding; and
 a second switch configured to couple and decouple the rectifier circuit to and from an end terminal of the secondary winding.

19. The bi-directional DC/DC converter according to claim 14, further comprising a parallel combination of a switch and an inductor coupled between a terminal of the energy storage device and a center tap of the primary winding of the transformer.

* * * * *